United States Patent Office 3,803,169
Patented Apr. 9, 1974

3,803,169
CYCLOALKANOYL-SUBSTITUTED PYRROLES
John Robert Carson, Norristown, Pa., assignor to
McNeil Laboratories, Inc.
No Drawing. Filed Jan. 21, 1972, Ser. No. 219,861
Int. Cl. C07d 27/26
U.S. Cl. 260—326.2        11 Claims

ABSTRACT OF THE DISCLOSURE

Compounds of the class of 5-cycloalkanoyl-pyrrole-2-acetic acids useful as anti-inflammatory agents and the corresponding ester, amide and nitrile precursors thereof.

BACKGROUND OF THE INVENTION

The invention pertains to the field of 5-cycloalkanoyl-pyrrole-2-acetic acids which demonstrate anti-inflammatory activity. The subject pyrroles differ from those in the prior art (see Belgian Pat. No. 762,060) by having a cycloalkanoyl group in the 5-position instead of an aroyl group.

DESCRIPTION OF THE PREFERRED EMBODIMENTS

The novel 5-cycloalkanoyl-pyrroles of this invention may be structurally represented by the formula:

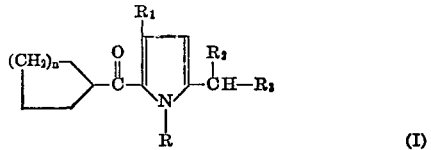

(I)

wherein $n$ is the integer 1 or 2; R is a member selected from the group consisting of hydrogen and loweralkyl; $R_1$ is a member selected from the group consisting of hydrogen and methyl; $R_2$ is a member selected from the group consisting of hydrogen and methyl; and $R_3$ is a member selected from the group consisting of COOH, COO-(loweralkyl), $CONH_2$ and CN, provided that, when said $R_2$ is methyl, then said R is loweralkyl, and when said $R_1$ is methyl, then $R_3$ is COOH and COO-(loweralkyl).

The preferred pyrroles of Formula I are those wherein $R_3$ is COOH, as represented by Formula I-a, such

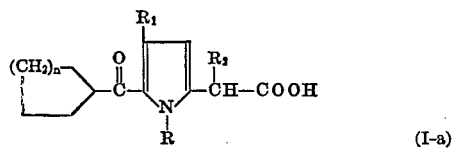

(I-a)

novel pyrrole acids having the aforementioned anti-inflammatory activity. Among these, the most preferred compounds are those wherein $n$ is 2, that is, the 5-cyclohexanoyl derivatives.

The other pyrroles of Formula I, namely, the ester, amide and nitrile derivatives, as represented by Formula I-b,

[Z=COO-(loweralkyl); $CONH_2$; and CN]

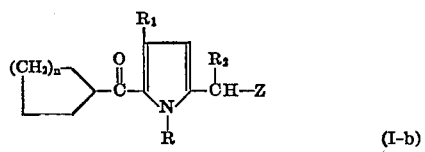

(I-b)

are also novel and, in view of their utility as precursors in the synthesis of the Formula I-a pyrrole acids, these compounds constitute an additional part of the present invention. Again, the most preferred compounds are the 5-cyclohexanoyl derivatives.

As used herein, "loweralkyl" may be straight or branch chained and have from 1 to 5 carbon atoms, such as, for example, methyl, ethyl, propyl, isopropyl, butyl, sec-butyl, pentyl and the like alkyls.

The subject compounds, wherein $R_2$ is hydrogen and $R_3$ is COO-(loweralkyl), are generally prepared by a Friedel-Crafts reaction between an appropriate cycloalkanoyl halide II, for example, cyclohexanoyl chloride and cyclopentanoyl chloride, and a pyrrole-2-acetic acid ester of Formula III, wherein R' is COO-(loweralkyl), in the presence of a Lewis acid, preferably a metallic halide such as aluminum chloride, stannic chloride and the like. The nitrile compounds corresponding to Formula IV, that is, where R' is CN and both $R_1$ and $R_2$ are hydrogen, are prepared in a similar manner from an appropriate precursor of Formula III. Suitable solvents are those typically employed in a Friedel-Crafts reaction, such as, for example, methylene chloride, 1,2-dichloroethane, carbon disulfide, nitrobenzene and the like. The acid derivative IV thus obtained can then be converted to the corresponding free carboxylic acid by conventional hydrolysis, for example, by heating a solution of IV in aqueous methanol with an alkali metal hydroxide to form the alkali metal salt of the acid and then acidifying the mixture. The foregoing reactions may be illustrated by the following schematic diagram:

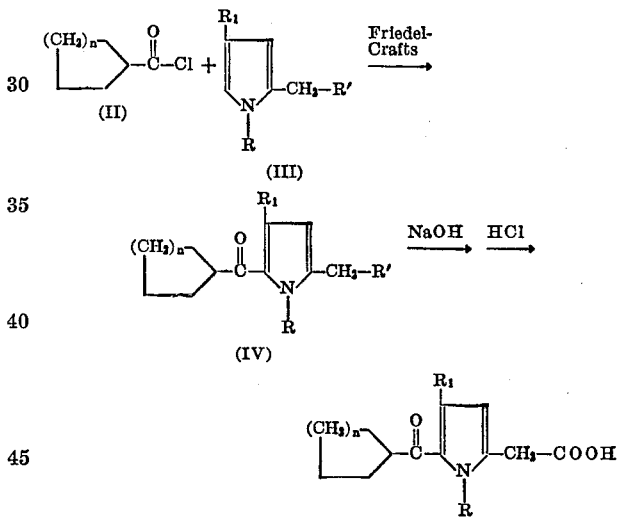

To prepare the nitriles and esters of Formula IV, wherein R is loweralkyl and $R_2$ is methyl, an α-unsubstituted derivative of Formula V, which derivative may be obtained in accordance with the aforementioned Friedel-Crafts procedure, is C-methylated according to standard techniques, e.g., with a methyl halide, preferably the iodide, as the alkylating agent in the presence of a strong base such as sodium amide or sodium hydride, to yield the corresponding α-Me nitriles and esters:

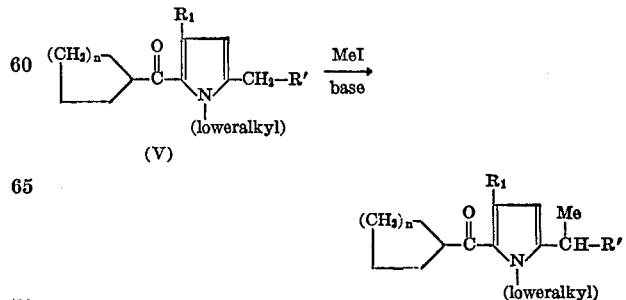

from which the corresponding acids are obtained by conventional hydrolysis.

The acetonitriles of Formula I, in which $R_1$ is H, R is loweralkyl and $R_2$ is methyl are also obtained by conventional N-alkylation of an appropriate N-unsubstituted 5-cycloalkanoyl-pyrrole-2-acetonitrile of Formula VI as follows:

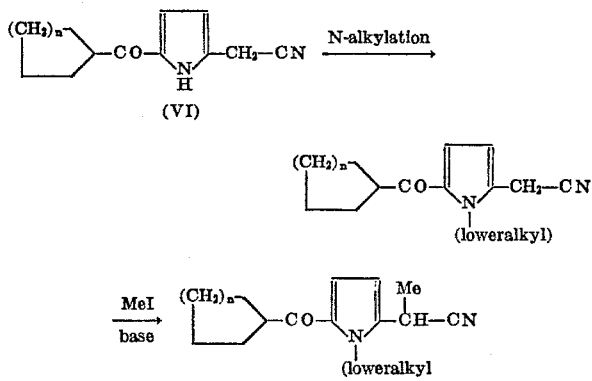

by conventional C-methylation of the thus-obtained 5-cycloalkanoyl-N-loweralkyl-pyrrole-2-acetonitrile using an appropriate loweralkyl halide and methyl halide, respectively, as the alkylating agent in each step. After the N-alkylation step or the C-alkylation step, corresponding acids may be obtained by conventional hydrolysis.

The amides of Formula I, that is, with $R_3$ equal to $CONH_2$, are readily obtained by partial hydrolysis of the corresponding nitriles ($R_3$=CN). The nitrile-to-amide transformation is accomplished according to conventional procedures, for example, by treatment of the nitrile with aqueous sodium hydroxide under reflux for a relatively short time, that is, a period sufficient for partial hydrolysis to the amide stage as opposed to complete hydrolysis to the carboxylic stage. Alternatively, the amides of Formula I may be obtained by conventional ammonolysis of the corresponding loweralkyl esters ($R_3$=COO-loweralkyl). The amide derivative thus-obtained are converted to the corresponding carboxylic acids ($R_3$=COOH) by conventional hydrolysis.

The acids of Formula I, that is $R_3$=COOH, possess anti-inflammatory activity as demonstrated in the standard kaolin-induced rat paw edema assay (described in Belgian Pat. No. 762,060) at doses ranging from about 5 to about 250 mg./kg. body weight. For example, with 5-cyclohexanoyl-1-methylpyrrole-2-acetic acid, the most preferred species, an inhibition of 67% is observed in this assay at a dosage of 100 mg./kg. body weight.

Due to the available α-carbon atom (when $R_2$ is methyl) present in the subject Compounds I, it is evident that their existence in the form of stereochemical isomers (enantiomorphs) is possible. By standard methods of resolution the corresponding (−) or (+) forms of the desired compounds will be obtained. Such pharmaceutically active enantiomorphs of the acid compounds ($R_3$=COOH) are naturally intended to be included within the scope of this invention.

The following examples are intended to illustrate, but not to limit, the scope of the present invention.

EXAMPLE I (A) 5 - cyclohexylcarbonyl-1-methylpyrrole-2-acetonitrile.—A solution of 14.6 ml. (0.1 mole) cyclohexylcarbonyl chloride and 12 g. (0.1 mole) 1-methylpyrrole-2-acetonitrile in 100 ml. methylene chloride is cooled to −25° C. with an appropriate bath. To this is added 11.3 ml. stannic chloride in 40 ml. methylene chloride over a period of one-half hour. After the addition, the orange suspension is allowed to come to room temperature and then poured into dilute hydrochloric acid. The organic phase is separated and washed consecutively with N,N-dimethyl-1,3-propanediamine, 3 N hydrochloric acid and a saturated solution of sodium chloride, and then dried over anhydrous magnesium sulfate. The solvent is evaporated. A white solid 5-cyclohexylcarbonyl-1-methylpyrrole-2-acetonitrile, which crystallizes in the residual oil upon treatment with methanol, is separated and purified by recrystallization in methanol, M.P. 112–4° C.

(B) The procedure of Example I–(A) is repeated except that an equivalent quantity of cyclopentylcarbonyl chloride is used as the acylating agent to yield, as the final product, 5-cyclopentylcarbonyl-1-methylpyrrole-2-acetonitrile.

EXAMPLE II (A) 5 - cyclohexylcarbonyl - 1-methylpyrrole-2-acetic acid.—A solution of 5 g. (0.022 mole) 5-cyclohexylcarbonyl-1-methylpyrrole-2-acetonitrile in 44 ml. 1 N sodium hydroxide and 40 ml. 95% ethanol is heated to reflux for 18 hours. It was then cooled and poured onto ice acidified with dilute hydrochloric acid. The suspension is then partitioned between acid and chloroform. The chloroform phase is separated and evaporated. The resulting oil is partitioned between ether and 3 N hydrochloric acid. The ether phase is extracted with a saturated solution of sodium bicarbonate three times. The basic fractions are combined and acidified with dilute hydrochloric acid. A white precipitate, 5-cyclohexyxlcarbonyl-1-methylpyrrole-2-acetic acid, is separated by filtration, M.P. 112.5–115° C. After recrystallization from ether-methyl cyclohexane solution, the M.P. is 113–5° C.

(B) By following the procedure of Example II–(A), except that an equivalent amount of the 5-cyclopentanoyl product obtained from Example I–(B) is used in place of the 5 - cyclohexylcarbonyl-1-methylpyrrole-2-acetonitrile, there is obtained the corresponding 5-cyclopentylcarbonyl acid product.

EXAMPLE III

Ethyl 5 - cyclohexylcarbonyl - 1-methylpyrrole-2-acetate.—A suspension of 5.2 g. of aluminum chloride in 20 ml. of methylene chloride is cooled at 5° C. and a 5.7 g. sample of cyclohexane carboxylic acid chloride added. The mixture is then added dropwise to a solution of 6.5 g. of ethyl 1-methylpyrrole-2-acetate in 60 ml. of methylene chloride at 5° C. After the addition, the reaction is stirred for 20 minutes while it is allowed to warm to room temperature and then poured into dilute HCl. The organic layer is separated and washed successively with N,N-dimethylaminopropylamine, dilute HCl, and brine. It is dried (MgSO$_4$) and the solvent evaporated in vacuo. The product is isolated by chromatography on SilicAR CC–4. The column is eluted with hexane followed with hexane containing increasing percentages of benzene. The first fraction to come off which contains ultraviolet absorbing material is evaporated to dryness to yield ethyl 5-cyclohexylcarbonyl-1-methylpyrrole-2-acetate.

EXAMPLE IV

5 - cyclohexylcarbonyl-1-methylpyrrole-2-acetic acid.— A mixture of 0.01 mole of ethyl 5-cyclohexylcarbonyl-1-methylpyrrole-2-acetate in 12 ml. (0.012 mole) or 1 N sodium hydroxide solution and 5 ml. of 95% ethanol is refluxed for 30 minutes, then cooled and diluted with water and the ethanol is evaporated in vacuo. The solution is filtered and the filtrate acidified with dilute hydrochloric acid. The precipitated solid is collected by filtration, dried and recrystallized from methanol-water to yield the purified product, 5-cyclohexylcarbonyl-1-methylpyrrole-2-acetic acid.

EXAMPLE V

Substitution of an equivalent quantity of ethyl 1,4-dimethylpyrrole-2-acetate for ethyl 1-methylpyrrole-2-acetate in the procedure of Example III affords ethyl 5-cyclohexylcarbonyl-1,4-dimethylpyrrole-2-acetate as the product. Subsequent hydrolysis in accordance with the procedure of Example IV affords the corresponding acid, 5-cyclohexylcarbonyl-1,4-dimethylpyrrole-2-acetic acid.

EXAMPLE VI (A) 5-cyclohexylcarbonyl-1,α-dimethylpyrrole-2-acetonitrile.—2.24 grams of 5-cyclohexylcarbonyl-1-methylpyrrole-2-acetonitrile are added to a suspension of 0.42 g. of 57% sodium hydride in 30 ml. dry dimethylsulfoxide. After stirring for 30 minutes, 1.56 g. of methyl iodide is added while the solution is stirred in an ice bath. The mixture is stirred for 30 minutes, then poured into water and extracted with ether. The ether solution is washed with brine, dried ($MgSO_4$) and evaporated in vacuo to give the product, 5-cyclohexylcarbonyl - 1,α - dimethylpyrrole-2-acetonitrile.

(B) By applying the above procedure but substituting an equivalent quantity of ethyl 5-cyclohexylcarbonyl-1,4-dimethylpyrrole-2-acetate for 5 - cyclohexylcarbonyl-1-methylpyrrole-2-acetonitrile there is obtained as the final product, ethyl 5 - cyclohexylcarbonyl-1,4,α-trimethylpyrrole-2-acetate.

EXAMPLE VII

5 - cyclohexylcarbonyl - 1 - methylpyrrole - 2 - acetamide.—A mixture of 2.24 g. of 5-cyclohexylcarbonyl-1-methylpyrrole-2-acetonitrile in 20 ml. 95% ethanol containing 0.4 g. of sodium hydroxide is heated under reflux for 20 minutes. The solvent is evaporated in vacuo and the product, 5-cyclohexylcarbonyl - 1 - methylpyrrole-2-acetamide, is obtained by trituration with water and subsequent filtration.

EXAMPLE VIII 5-cyclohexylcarbonyl - 1 - methylpyrrole - 2 - acetic acid.—A mixture of 0.015 mole of 5-cyclohexylcarbonyl-1-methylpyrrole-2-acetamide, 30 ml. of 1 N sodium hydroxide solution and 30 ml. 95% ethanol is refluxed and stirred for 6 hours. The ethanol is then evaporated in vacuo. The resulting solid is dissolved in water and the solution filtered from insolubles. The filtrate is acidified with dilute HCl. The solid precipitate, 5-cyclohexylcarbonyl-1-methylpyrrole-2-acetic acid, is purified by recrystallization from acetone:water (1:1).

EXAMPE IX (A) 5-cyclohexanoyl-pyrrole - 2 - acetonitrile.—To a chilled suspension (−5° C.) of 0.2 mole of aluminum chloride in 110 ml. of methylene chloride is added dropwise 0.2 mole of cyclohexanoyl chloride. The mixture is then added dropwise to a solution of 0.2 mole of pyrrole-2-acetonitrile in 125 ml. methylene chloride which is cooled externally with an ammonium chloride ice bath. After addition is complete, the reaction mixture is stirred for ten minutes at 0° C. and then poured into ice acidified with dilute HCl. The solid precipitate, 5-cyclohexanoyl-pyrrole-2-acetonitrile, is filtered off, washed with methanol and dried.

(B) 5-cyclohexanoyl-pyrrole-2-acetic acid.—The nitrile product obtained in Example IX–(A) is subjected to the nitrile-to-acid hydrolysis procedure of Example II–(A) to yield, as the final product, 5-cyclohexanoyl-pyrrole-2-acetic acid.

EXAMPLE X (A) 5-cyclohexanoyl-1-ethylpyrrole - 2 - acetonitrile.—A mixture of 0.1 mole 5-cyclohexanoyl-pyrrole-2-acetonitrile, 0.3 mole (41.7 g.) of potassium carbonate and 0.105 mole (16.1 g.) of ethyl iodide in 300 ml. of methylethylketone is refluxed for 12 hours. The reaction mixture is then poured into water and extracted with chloroform. The organic solutions are combined, dried over anhydrous magnesium sulfate and the solvent evaporated in vacuo. The residue is crystallized and recrystallized from 2-propanol to yield as the product, 5-cyclohexanoyl-1-ethylpyrrole-2-acetonitrile.

(B) 5-cyclohexanoyl-1-ethylpyrrole-2-acetic acid is obtained by hydrolyzing the nitrile of Example X–(A) in accordance with the nitrile-to-acid transformation procedure of Example II–(A).

EXAMPLE XI (A) 5-cyclohexylcarbonyl-1,α-dimethylpyrrole-2-acetic acid.—The nitrile-to-acid transformation procedure of Example II–(A) is followed, except that an equivalent quantity of 5-cyclohexylcarbonyl-1,α-dimethylpyrrole-2-acetonitrile is used as the starting nitrile to be hydrolyzed, to yield as the final product: 5-cyclohexylcarbonyl-1,α-dimethylpyrrole-2-acetic acid.

(B) 5 - cyclohexylcarbonyl - 1,4,α - trimethylpyrrole-2-acetic acid.—The ester-to-acid transformation procedure of Example IV is followed, except that an equivalent amount of ethyl 5-cyclohexylcarbonyl-1,4,α-trimethylpyrrole-2-acetate is used as the starting ester to be hydrolyzed, to yield as the final product: 5-cyclohexylcarbonyl-1,4,α-trimethylpyrrole-2-acetic acid.

What is claimed is:

1. A 5-cycloalkanoyl-pyrrole of the formula:

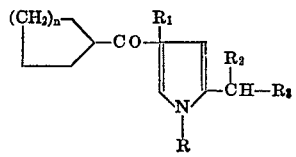

wherein $n$ is the integer 1 or 2; R is a member selected from the group consisting of hydrogen and loweralkyl; $R_1$ and $R_2$ are each a member selected from the group consisting of hydrogen and methyl; and $R_3$ is a member selected from the group consisting of COOH, COO-(loweralkyl), $CONH_2$ and CN; provided that, when said $R_2$ is methyl, then said R is loweralkyl, and when said $R_1$ is methyl, then said $R_3$ is COOH and COO-(loweralkyl).

2. A 5-cyclohexanoyl-pyrrole - 2 - acetic acid of the formula:

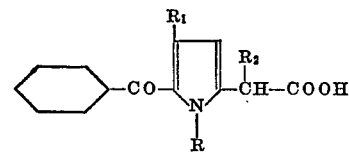

wherein R is a member selected from the group consisting of hydrogen and loweralkyl; $R_1$ and $R_2$ are each a member selected from the group consisting of hydrogen and methyl; provided that, when said $R_2$ is methyl, then said R is loweralkyl.

3. A 5-cyclohexanoyl-pyrrole of the formula:

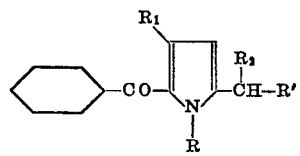

wherein R is a member selected from the group consisting of hydrogen and loweralkyl; $R_1$ and $R_2$ are each a member selected from the group consisting of hydrogen and methyl; and R' is a member selected from the group consisting of COO-(loweralkyl), $CONH_2$ and CN; provided that, when said $R_2$ is methyl, then said R is loweralkyl, and when said $R_1$ is methyl, then said R' is COO-(loweralkyl).

4. A 5-cyclohexanoyl-1-methylpyrrole-2-acetic acid of the formula:

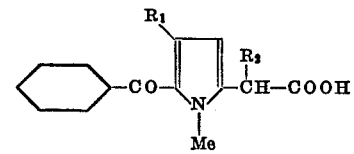

wherein $R_1$ and $R_2$ are each a member selected from the group consisting of hydrogen and methyl.

5. 5-cyclohexanoyl-1-methylpyrrole-2-acetic acid.
6. 5-cyclohexanoyl-1,α-dimethylpyrrole-2-acetic acid.
7. 5-cyclohexanoyl-1,4-dimethylpyrrole-2-acetic acid.
8. 5-cyclohexanoyl-1,4-α-trimethylpyrrole-2-acetic acid.
9. 5-cyclohexanoyl-1-methylpyrrole-2-acetonitrile.
10. Loweralkyl 5 - cyclohexanoyl - 1 - methylpyrrole-2-acetate.
11. Ethyl 5-cyclohexanoyl-1-methylpyrrole-2-acetate.

References Cited
UNITED STATES PATENTS
3,707,478  12/1972  Carson _____ 260—326.3

JOSEPH A. NARCAVAGE, Primary Examiner

U.S. Cl. X.R.
260—326.5 J, 999

PO-1050
(5/69)

UNITED STATES PATENT OFFICE
CERTIFICATE OF CORRECTION

Patent No. 3,803,169            Dated April 9, 1974

Inventor(s) John Robert Carson

It is certified that error appears in the above-identified patent and that said Letters Patent are hereby corrected as shown below:

In Column 4, line 25, "5-cyclohexyxcarbonyl" should read --- 5-cyclohexylcarbonyl ---.

In Column 4, line 59, "or" should read --- of ---.

Signed and sealed this 11th day of March 1975.

(SEAL)
Attest:

RUTH C. MASON
Attesting Officer

C. MARSHALL DANN
Commissioner of Patents
and Trademarks